(12) United States Patent
Gross et al.

(10) Patent No.: US 7,726,075 B2
(45) Date of Patent: Jun. 1, 2010

(54) DUAL-SHOT INJECTION MOLDED WEATHERSEAL

(75) Inventors: David M. Gross, Clinton Township, MI (US); Riaz Mohammed, Novi, MI (US)

(73) Assignee: Cooper-Standard Automotive Inc., Novi, MI (US)

( * ) Notice: Subject to any disclaimer, the term of this patent is extended or adjusted under 35 U.S.C. 154(b) by 213 days.

(21) Appl. No.: 11/485,501

(22) Filed: Jul. 12, 2006

(65) Prior Publication Data

US 2008/0010903 A1   Jan. 17, 2008

(51) Int. Cl.
*E05D 13/00* (2006.01)
(52) U.S. Cl. ...................................................... 49/415
(58) Field of Classification Search .................. 49/440, 49/441, 414, 415
See application file for complete search history.

(56) References Cited

U.S. PATENT DOCUMENTS

| | | | | |
|---|---|---|---|---|
| 5,771,637 | A | * | 6/1998 | Oikawa et al. ................. 49/416 |
| 5,943,823 | A | * | 8/1999 | Yoshida et al. ................ 49/416 |
| 6,305,125 | B1 | * | 10/2001 | Nozaki et al. ................. 49/416 |
| 6,430,878 | B2 | * | 8/2002 | Terasawa et al. .............. 49/416 |

OTHER PUBLICATIONS

PCT/US2007/15627 International Search Report, mailed Aug. 27, 2008.

* cited by examiner

*Primary Examiner*—Jerry Redman
(74) *Attorney, Agent, or Firm*—Fay Sharpe LLP

(57) ABSTRACT

A molded weather seal includes groups of fingers extending inwardly from walls that receive an associated vehicle flange therebetween. Fingers and walls are preferably formed of a first shot of molded material that is generally rigid, while a seal lip and/or other selected portions may be formed from a second, more flexible material.

19 Claims, 3 Drawing Sheets

DUAL-SHOT INJECTION MOLDED WEATHERSEAL

BACKGROUND OF THE INVENTION

Weatherseals or weatherstrips provided around a perimeter of a door opening are common in the industry. For example, one or more weatherstrips are provided about the inner perimeter of the door opening, for example along the A-pillar, header portion, B-pillar, etc. One such known structure is an extruded seal that includes a metal core. The metal core has a generally U-shaped profile and is embedded within an extruded elastomeric material. Generally parallel legs of the U-shaped profile include gripping portions that extend along the entire longitudinal extent of the profile into the cavity between the legs and provide for the gripping engagement because the gripping portions are extruded.

One leg of the weatherseal profile is disposed adjacent an external surface of the weatherseal when the weatherseal is positioned on the vehicle. As the elastomeric material cures over the surface of the metal core, unfortunately the external surface of the elastomer often assumes or shows the configuration of the core metal. This can result in an unsightly or non-pleasing appearance to the weatherseal, sometimes referred to as "hungry-horse" since the lanced metal core shows through the elastomeric extrudate like a series of ribs protruding from a horse. Using a core such as the lanced metal core is desirable since the core provides additional strength for manipulating and mounting the weatherseal to the vehicle. On the other hand, the core oftentimes limits the design since the core is typically an extruded profile. Formation by extruding limits the design to cross-sectional configurations that can be extruded, i.e., symmetrical along a longitudinal axis, and if additional non-symmetrical features, designs, or profiles are desired, or features that extend generally perpendicular to the axis of extrusion, post-extrusion steps are required to modify the extruded cross-section. For example, it may be desirable to close out one end of the extruded weatherseal in order to merge the weatherseal with the vehicle body and limit any unsightly gaps. Likewise, it is commonplace to provide post-extrusion secondary operations to the weatherseal that cannot be achieved during the extrusion process, including molded details.

It is common that the core is metal while the extrudate is an elastomer such as rubber or thermoplastic. The metal core adds weight to the overall structure. In addition, the different materials of construction incorporated into the weatherseal are not desirable from a recycling standpoint since the materials must be segregated. Thus, either the costs to recycle the material become too expensive or, as is more often the case, the component is simply not recycled due to such expense.

In addition, mounting the extruded weatherseal to the vehicle flange has its attendant problems. Specifically a tool, such as a mallet, is typically used by the installer on the vehicle assembly line to forcibly secure the weatherseal on the vehicle flange, but without any precision. That is, the operator must rely on his or her own expertise to determine whether the weather seal is properly installed. The U-shaped profile of the gripping legs of the weather seal are advanced over the S-flange of the vehicle body. Other than visual perception, there is no assurance or feed-back to the installer that the weather seal has been properly secured to the flange. Unfortunately, from a quality control standpoint, this is not desirable since there is no assurance that installation from one vehicle to the next is the same.

Thus, a need exists for a lighter weight weatherseal that is more conducive to recycling, less expensive to manufacture, has greater capability of design variation, and provides a confirmation to the installer of proper installation.

SUMMARY OF THE INVENTION

An improved automotive component such as a weatherseal incorporates a snap-fit connecting feature that provides both an audible and tactile "click" or "snap" when the weatherseal is properly installed on a vehicle flange.

The weatherseal is preferably a molded construction allowing variation in the cross-sectional profile along its length.

The weather seal advantageously includes protrusions or fingers that are axially spaced along the length of the weather seal. The fingers preferably have a shoulder separating an undercut region from an enlarged holding portion. The advancement of the holding portion over the vehicle flange so that the flange is engaged by the holding portion and the undercut region provides an audible and tactile response, i.e., a click or snap, that can be easily perceived by the installer.

According to a preferred arrangement, selected groups of fingers are joined by an interconnecting wall to provide flexibility in installation and flexibility to the weatherseal to conform to the vehicle flange.

The fingers preferably have tapered or chamfered lead-in portions to facilitate advancement of the weatherseal over the flange during installation.

A primary advantage resides in the assurance of a proper installation of the weatherseal on the vehicle.

Another advantage is associated with the low cost.

Still another feature is the ability to provide a wide array of design profiles.

Still another advantage is the ease with which the components can be recycled.

Yet another feature is the light weight of the component that contributes to overall weight reduction of the vehicle.

Still other features and advantages will become apparent from reading and understanding the following detailed description.

DETAILED DESCRIPTION OF THE INVENTION

Figure 1:
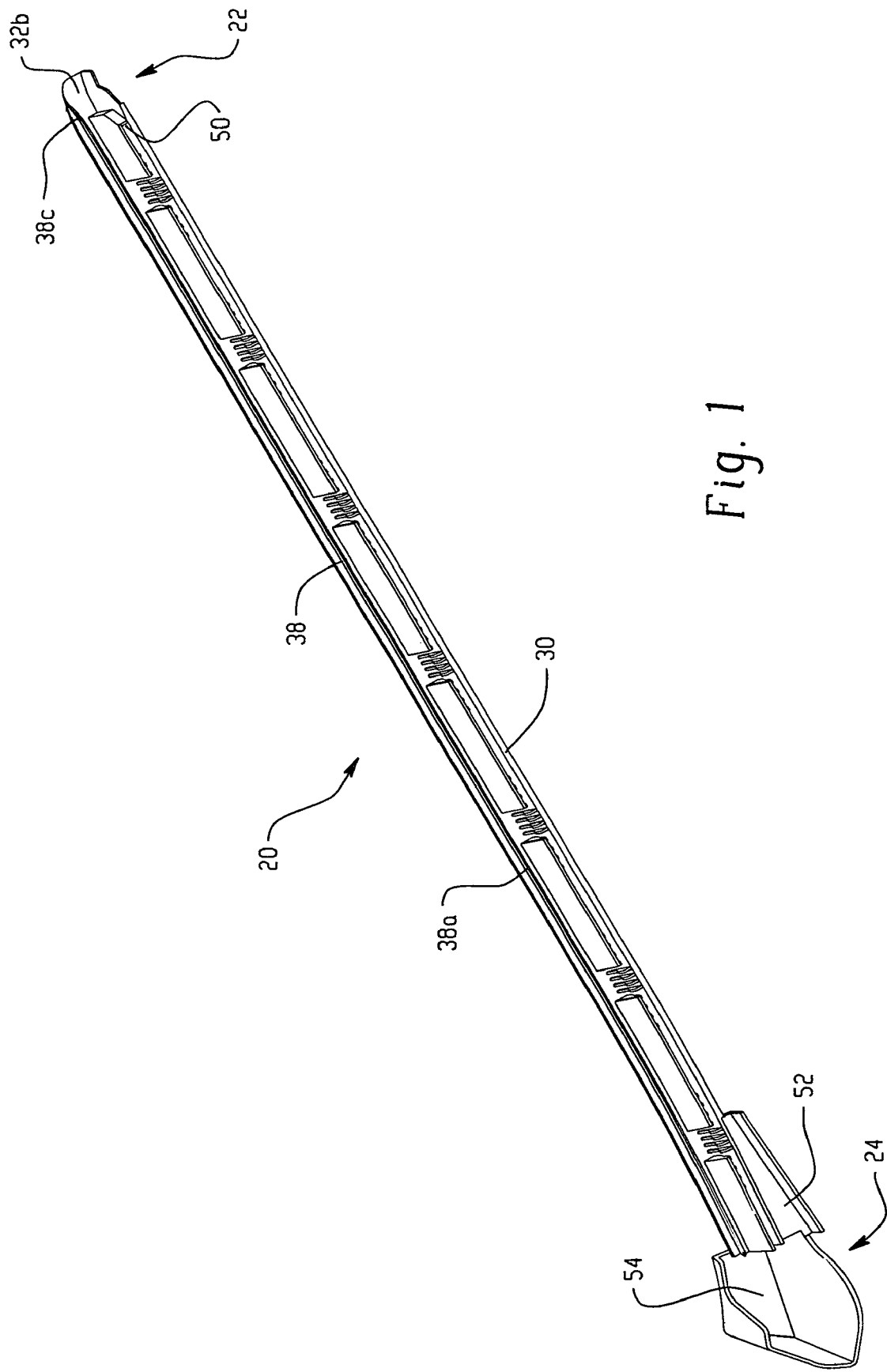
FIG. 1 is a perspective view of the subject new weatherseal.

FIG. 1 shows an embodiment of an elongated vehicle component such as a weatherstrip or weatherseal 20 having a first or upper end 22 and a second or lower end 24. The terms "upper" and "lower" refer to the installation positions of the respective ends of the weatherseal once installed on a vehicle such as an A-pillar of an automobile. However, the present invention is not limited to use along an A-pillar. Rather, one skilled in the art will appreciate that the features of this invention may be used in connection with other locations or components on the vehicle. The weatherseal 20 is a molded construction, particularly a dual shot molded construction. In other words, different portions of the weatherseal are formed from different moldable materials, and the structure is not removed from the mold until all materials have been introduced and at least partially cured, i.e., a first shot or introduction of first molding material, and a second shot or introduction of a second molding material, whereby the materials are maintained in the mold until sufficiently cured for removal. In this manner, seams are limited between the different mold materials and a unitary, one-piece molded structure exhibiting different properties in different regions of the weatherseal is achieved.

Figure 2:
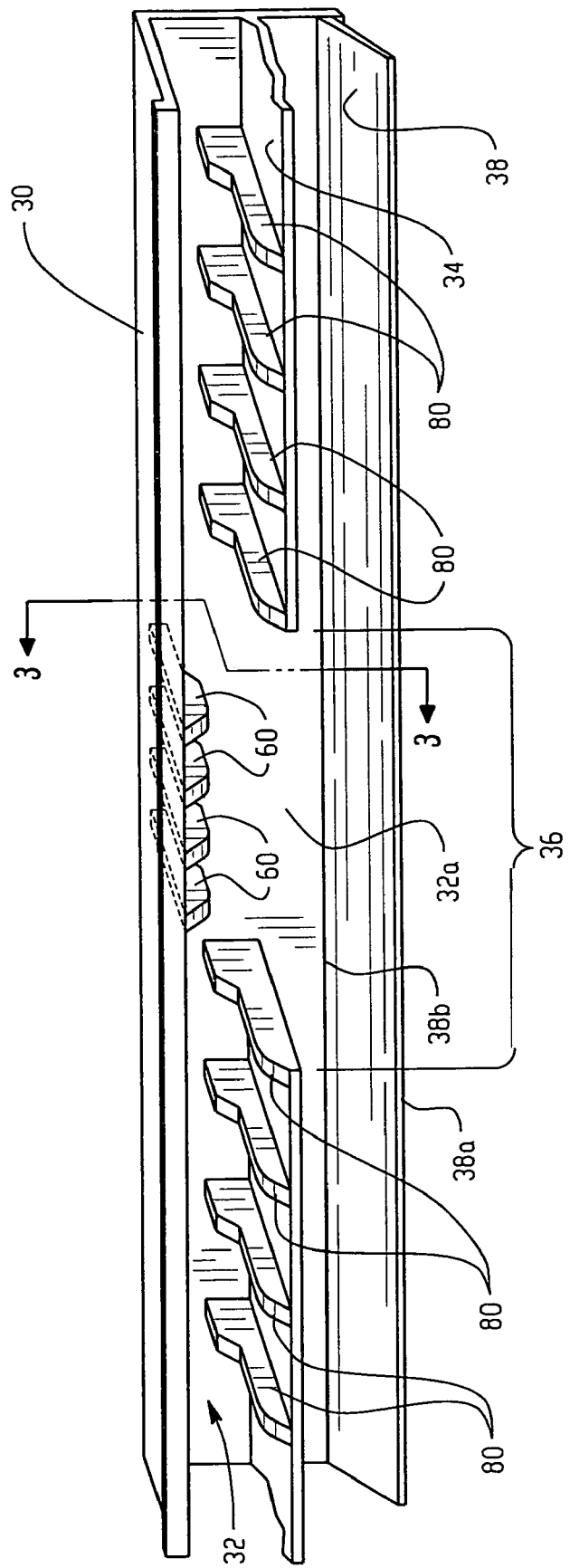
FIG. 2 is an enlarged view of the groups of gripping fingers employed in the weatherseal of FIG. 1.

As shown in FIGS. 1 and 2, a first longitudinal wall 30 extends from one edge of a base wall 32 and a second wall 34 extends from a second edge of the base wall. Preferably, the first and second walls 30, 34 extend in generally parallel relation and are substantially perpendicular to the base wall 32 to define a generally U-shaped structure. Moreover, these walls extend generally along the entire length of the weather seal. More specifically, the first wall 30 is continuous from the first end 22 to the second end 24. The second wall 34, on the other hand, has spaced portions or regions 36 so that the series of spaced portions 34 defines the second wall. The base wall 32 extends beyond the second wall 34 (as represented by reference numeral 32a).

The first and second walls, and the base wall are all preferably made from a first moldable material. For the particular purposes here, the first molded material is a generally rigid thermoplastic. On the other hand, a seal lip 38 extends at an angle outwardly from an edge of the base wall portion 32a. The lip 38 is preferable formed of a second, less rigid molded material that will more easily deflect or conform in response to light pressure. This second molded material is ideal for allowing the lip to merge into engagement with the window along the A-pillar section. Preferably the seal lip has a slightly wider or thicker conformation where it joins to the bottom wall 32a and tapers or thins to an edge 38a that engages with the glass. Thus, due to its reduced cross-sectional thickness, the edge 38a is slightly more pliable than edge 38b that joins with the more rigid plastic along the edge of base wall 32a. As will also be appreciated, and as illustrated in FIG. 1, the tapered seal also extends substantially along the length of the weather seal from the first end to the second end.

With continued reference to FIG. 1, close out details or profiles are provided at the opposite ends. For example, at the first end 22, the base wall 32 thins as it extends longitudinally to its terminal end, and thus becomes slightly more flexible than the remainder of the base wall along the longitudinal extent of the weather seal. This allows the end 22 to conform more easily to the vehicle. In addition, the seal lip 38 tapers as shown at 38c and merges into this more flexible portion of the base wall 32, referenced as 32b.

In addition, one of the wall portions 34 (namely the right-hand most wall portion, or uppermost wall portion, as shown in FIG. 1) is interconnected at one end with the first wall portion 30. Stated another way, an additional wall 50 interconnects one end of second wall portion 34 with first wall portion 30. This is a typical close-out used in the prior art to accurately locate the longitudinal position of the weatherseal on the vehicle. That is, the inner surface of the wall 50 forms an abutment surface that engages a vehicle flange (as will be described in greater detail with respect to FIG. 3) and accurately locates the longitudinal position of the weatherseal relative to the vehicle.

A molded detail is also provided at the opposite or lower end 24 of the weather seal. Specifically, a generally triangular flange 52 extends generally perpendicularly from the rigid wall 30. Preferably the triangular portion is also formed from the second molded material and has greater flexibility than the first molded material. Again, this detail allows the weatherseal to conform to the vehicle and fill a similarly sized gap between adjacent components of the vehicle. Further, an enlarged formed detail or mucket 54 extends from a longitudinal end of the weatherseal. This component detail is also preferably primarily formed from the more flexible or second molded material, although portions thereof may also include the first molded material to provide some directional rigidity to the component for alignment and stability with the vehicle.

It will be recognized that since the weatherseal is a molded element, whether it be molded in a single shot or more than one shot, great flexibility is achieved and allows the designer to incorporate other features into the weatherseal. These features are of the type that normally can only be achieved with a post-extrusion operation (and associated attendant cost) with a prior art extruded arrangement, whereas this molded assembly can more easily conform to an infinite variety of designs.

Figure 3:
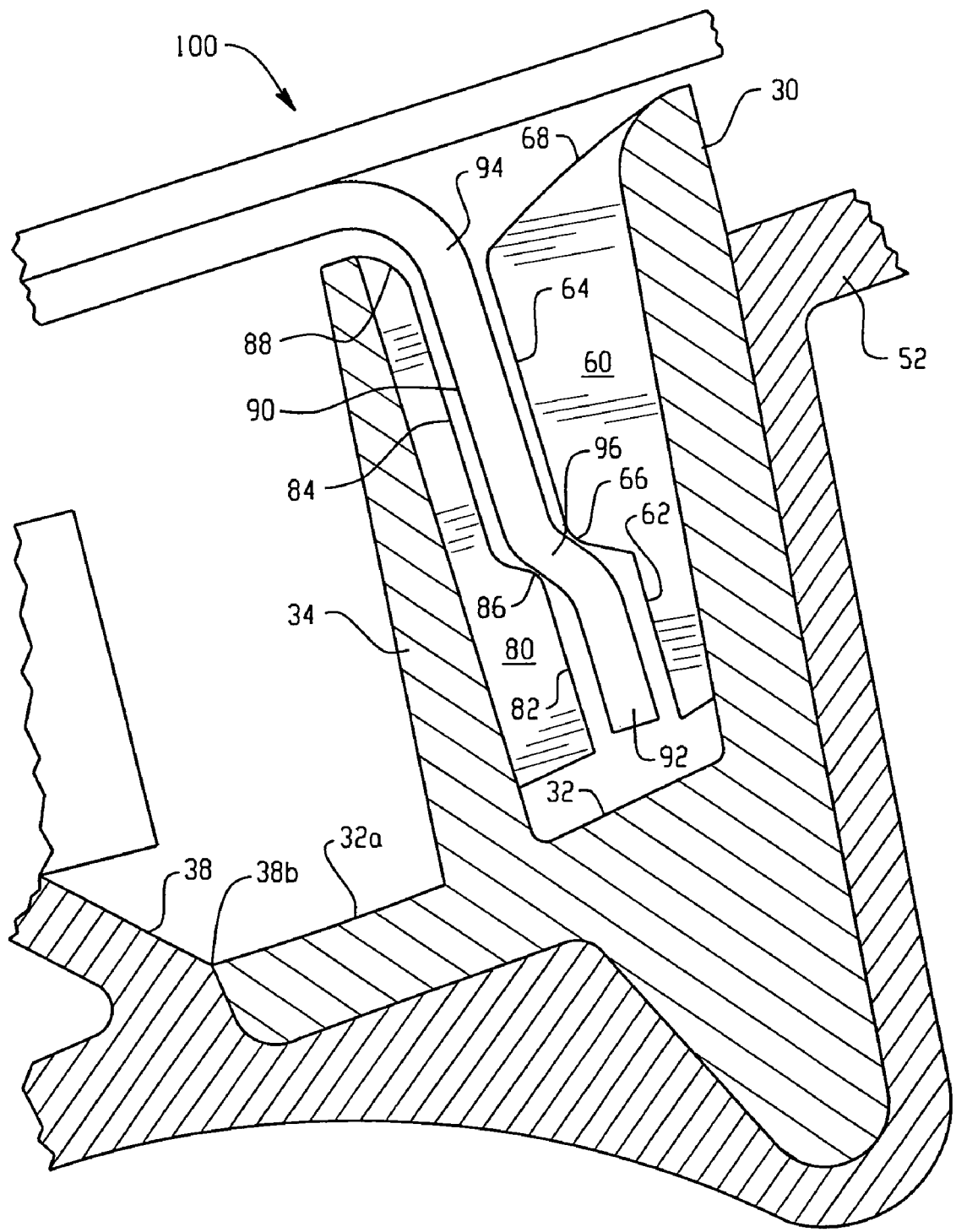
FIG. 3 is a cross-sectional view taken generally along the lines 3-3 of FIG. 2 illustrating the weatherseal mounted to an associated vehicle flange.

With continued reference to FIGS. 1 and 2, and more specific attention to FIG. 3, the audible and tactile snap feature will be shown and described in greater detail. Particularly, a series of projections or fingers 60 are disposed in spaced groups and extend inwardly from the first wall 30 toward the second wall 34. By way of example only, there are seven groups of fingers 60 generally equi-spaced along the longitudinal extent of the first wall 30. Each group in the exemplary embodiment includes four individual fingers. Each finger 60 includes an undercut portion 62 and an outwardly projecting portion 64. The interface between the undercut and projection is defined by a shoulder 66. As will be appreciated, the undercut portions 62 are disposed more closely adjacent the base wall 32. Tapered lead in regions 68 are provided on each finger and extend from the projecting portion and taper or merge outwardly toward the edge of the wall 30 remote from the base wall.

In a similar fashion, groups of fingers are also disposed on an inner surface of second wall 34. As previously noted, the second wall 34 is discontinuous at regions 36 along its length. These discontinuities or gaps conveniently align at locations opposite the groups of fingers 60 from the first wall. The second group of fingers 80 are disposed in groups of five and, except for the end-most groups, are joined together in paired groups by the second wall 34. Each of the group of second fingers 80 are thus offset axially or longitudinally along the weather seal from the first group of fingers 60.

In addition, each finger 80 includes a projecting portion 82, an undercut portion 84, and a shoulder 86 transitioning between the two. Whereas the undercut portion on the fingers 60 are disposed closer to the base wall along the first wall, it is the projecting portion 82 of the second group of fingers 80 that is disposed closer to the base wall 32 along the second wall 34. Stated another way, the undercut portions 84 merge into a terminal edge of the wall 34 via tapered lead-in portions 88, As shown in FIG. 3, the weatherseal is shown mounted on a vehicle flange. As will be appreciated, vehicle flange 90 has a generally S-shape, having a first portion 92 that extends generally parallel to a second portion 94 and interconnected by an angled or transition portion 96. The offset and size of the flange is such that the flange fits between the first and second walls 30, 34. As is best evident in FIG. 3, the conformations of the fingers 60, 80 also have a mating arrangement with that of the offset portions 92, 94 of the flange, as well as the interconnecting portion 96. That is, projecting portion 82 of the second fingers and undercut portion 62 of the first finger run generally parallel to the first portion 92 of the vehicle flange. Similarly, undercut portion 84 of the second finger and projecting portion 64 of the first finger run parallel to the second portion 94 of the flange, while transition portion 96 is generally disposed between the shoulders 66, 86 of the first and second fingers, respectively.

Although the walls 30, 34 are generally rigid with the fingers directed inwardly toward the opposite facing wall, it will be appreciated that when the walls 30, 34 are advanced in a direction generally parallel to the extent of the walls (see reference numeral 100) and over the flange 90, that the fingers and associated walls will flex slightly outward and then snap-fit inwardly toward their non-deflected position as shown in FIG. 3 once the flange is fully received between the opposing fingers. It will also be appreciated that none of the fingers are disposed directly opposite a set of fingers from the other wall along the longitudinal extent of the weatherseal. This, too, facilitates insertion.

As noted above, shoulder 50 is engaged over an upper edge of the flange 90. The remainder of the weatherseal is then advanced over the flange 90 by pressing the weather seal in a direction generally shown by the reference arrow 100 in FIG. 3. Leading ends 68, 88 of the fingers taper outwardly to advance over flange portion 92. The flange is advanced through the offset path defined between the fingers until fully seated as shown in FIG. 3. When fully seated, an audible click or snap is heard, and the tactile sensation of the weatherseal seating in place as shown in FIG. 3 is felt a flange portion 92 advance to the fully inserted position as shown in FIG. 3, where shoulders 66, 86 seat against the transition region 96 of the flange.

The invention has been described with reference to the preferred embodiment. Obviously, modifications and alterations will occur to others upon a reading and understanding of this specification. For example, the preferred embodiment uses preselected groups of fingers ("seven groups of fingers 60", "second group of fingers 80 are disposed in groups of five", etc.). This invention should not be limited to a specific number of fingers or a specific number of groups as will be appreciated by one skilled in the art. However, the invention allows components or products to effectively attach to "S" shaped flanges (whether it be used for sealing, trim, or other areas where a part needs to be snapped on to an attachment flange) and have many operations at the manufacturing level reduced, as well as eliminating the need for a metal core and thereby reducing weight and cost. Likewise, the array of locking features can be altered to suit insertion or extraction requirements for the product. The invention is intended to include all such modifications and alterations insofar as they come within the scope of the appended claims or the equivalents thereof.

Having thus described the invention, it is now claimed:

1. A weatherseal adapted for receipt on an associated vehicle flange, the weatherseal comprising:
    an elongated molded body having first and second substantially rigid walls disposed in generally parallel arrangement along a longitudinal axis, and interconnected to one another by a base wall;
    first projections extending from the first wall toward the second wall; and
    second projections extending from the second wall toward the first wall, the second projections axially offset from the first projections along the longitudinal axis and dimensioned to engage opposite faces of the associated vehicle flange when the weatherseal is received thereon, wherein the second projections include undercut portions and protruding portions that are separated by a shoulder for engaging respective offset surfaces of the associated flange, and wherein undercut portions of the first projections are disposed closer to the base wall than protruding portions thereof, while the undercut portions of the second projections are further from the base wall than the protruding portions thereof.

2. The invention of claim 1 wherein the first projections are disposed in segregated groups along the first wall.

3. The invention of claim 2 wherein the second projections are disposed in segregated groups along the second wall.

4. The invention of claim 1 wherein the second wall includes intermittent spaces along its length.

5. The invention of claim 4 wherein the first projections are spaced along the first wall and disposed opposite the spaces in the second wall.

6. The invention of claim 1 further comprising a seal lip extending from the weatherseal.

7. The invention of claim 6 wherein the seal lip is formed from a more flexible material than the body.

8. The invention of claim 1 wherein the first and second walls are joined by an interconnecting wall adjacent one end of the weatherseal.

9. The invention of claim 1 wherein the first and second projections are disposed in longitudinally spaced groups.

10. The invention of claim 9 wherein selected ones of adjacent groups of the second projections are joined by a second wall portion.

11. The invention of claim 9 wherein selected ones of adjacent groups of the second projections are longitudinally spaced.

12. The invention of claim 1 further comprising a detail adjacent a second end of the weatherseal is formed at least in part of a molded material that is less rigid than the body of the weatherseal.

13. A weatherseal adapted for receipt on an associated vehicle flange, the weatherseal comprising:
    an elongated molded body having first and second substantially rigid walls disposed in generally parallel arrangement along a longitudinal axis, and interconnected to one another by a base wall;
    first projections extending outwardly a first height from the first wall toward the second wall, the first projections including undercut portions and protruding portions that are separated by a shoulder, the undercut and protruding portions engaging respective offset surfaces of the associated flange; and
    second projections extending from the second wall toward the first wall, the second projections axially offset from the first projections along the longitudinal axis and dimensioned to engage opposite faces of the associated vehicle flange when the weatherseal is received thereon.

14. The invention of claim 13 wherein the second projections include undercut portions separated by a shoulder from protruding portions thereof for engaging offset surfaces of the associated flange.

15. The invention of claim 14 wherein the undercut portions of the first projections are disposed closer to the base wall than the protruding portions thereof, while the undercut portions of the second projections are further from the base wall than the protruding portions thereof.

16. The invention of claim 13 wherein the first projections are disposed in first groups along the first wall separated by a first space, the second projections are disposed in second groups along the second wall separated by a second space, the first groups are located opposite the second spaces, and the second groups are located opposite the first spaces.

17. The invention of claim 13 wherein the undercut portions of the first projections are disposed closer to the base wall than the protruding portions thereof, while the undercut portions of the second projections are further from the base wall than the protruding portions thereof.

18. The invention of claim 13 further comprising a seal lip extending from the weatherseal.

19. The invention of claim 18 wherein the seal lip is formed of a different material than the body.

\* \* \* \* \*